(12) United States Patent
Oi et al.

(10) Patent No.: US 7,791,295 B2
(45) Date of Patent: Sep. 7, 2010

(54) FIELD WEAKENING CONTROL APPARATUS FOR PERMANENT MAGNET MOTOR AND ELECTRIC POWER STEERING USING SAME

(75) Inventors: Kentaro Oi, Hitachinaka (JP); Kazuaki Tobari, Hitachiota (JP); Yoshitaka Iwaji, Hitachinaka (JP); Mitsuo Sasaki, Hadano (JP); Tatsuo Matsumura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 309 days.

(21) Appl. No.: 12/108,676

(22) Filed: Apr. 24, 2008

(65) Prior Publication Data

US 2008/0265809 A1 Oct. 30, 2008

(30) Foreign Application Priority Data

Apr. 25, 2007 (JP) ............................. 2007-114971

(51) Int. Cl.
*H02P 3/18* (2006.01)
*H02P 5/28* (2006.01)
*H02P 7/36* (2006.01)

(52) U.S. Cl. .................. 318/432; 318/727; 701/41; 701/42

(58) Field of Classification Search .............. 318/432, 318/727, 434, 800; 701/41–43
See application file for complete search history.

(56) References Cited

U.S. PATENT DOCUMENTS 5,656,911 A 8/1997 Nakayama et al.
6,639,379 B2 * 10/2003 Matsushita et al. .......... 318/727
7,049,779 B2 5/2006 Chen et al.
7,170,256 B2 1/2007 Iwashita et al.
2007/0024232 A1 2/2007 Suzuki et al.
2007/0085507 A1 4/2007 Tobari et al.

FOREIGN PATENT DOCUMENTS

| JP | 08-182398 | 7/1996 |
|----|-----------|--------|
| JP | 2000-116198 | 4/2000 |
| JP | 3455017 | 7/2003 |
| JP | 2005-80437 | 3/2005 |
| JP | 2005-110354 | 4/2005 |
| JP | 2006-20397 | 1/2006 |
| JP | 2006-020411 | 1/2006 |
| JP | 2006-81287 | 3/2006 |
| JP | 2007-37352 | 2/2007 |
| JP | 2007-116791 | 5/2007 |

* cited by examiner

*Primary Examiner*—Paul Ip
(74) *Attorney, Agent, or Firm*—Antonelli, Terry, Stout & Kraus, LLP.

(57) ABSTRACT

A motor control apparatus which controls an output voltage reference for an inverter driving a permanent magnet synchronous motor based on d-axis and q-axis current references, d-axis and q-axis current detected values, and a computed frequency value. When a torque reference specifying torque greater than maximum torque that the motor can output is input, a limit value for a phase angle that is a deviation between a rotation phase reference of control and a rotation phase value of the motor is varied depending on a quantity of the predetermined state.

30 Claims, 13 Drawing Sheets

SECOND PHASE ANGLE COMPUTING UNIT

VOLTAGE PHASE $\delta vmax$ FOR WHICH LIMIT TORQUE IS OUTPUT

FIELD WEAKENING CONTROL APPARATUS FOR PERMANENT MAGNET MOTOR AND ELECTRIC POWER STEERING USING SAME

CROSS REFERENCE TO RELATED APPLICATIONS

This application claims the foreign priority benefit under Title 35, United States Code, §119(a)-(d) of Japanese Patent Application No. 2007-114971 filed on Apr. 25, 2007 in the Japan Patent Office, the disclosure of which is herein incorporated by reference in its entirety.

BACKGROUND OF THE INVENTION

1. Field of the Invention

The present invention relates to a field weakening control apparatus for a permanent magnet motor and electric power steering using the same.

2. Description of the Related Art

As to a conventional technique related to phase control in a weakened field region, in JP 2005-110354A, there is described a method which gives a speed control unit an instruction to lower a current reference based on a voltage phase angle, thereby limiting the current reference to control a voltage phase.

However, in the method of that Publication, variation in power supply voltage, variation in frequency, and variation in inductance are not taken into account, and hence maximum torque (limit torque) that the motor can output cannot be output.

SUMMARY OF THE INVENTION

An aspect of the present invention provides a field weakening control apparatus for a permanent magnet synchronous motor that stably drives without going out of order in the weakened field region even if a torque reference specifying torque above the limit torque is input and that can output the limit torque even when the power supply voltage, frequency, and/or inductance vary.

According to the aspect, when a torque reference specifying torque greater than limit torque is input, a limit value for a phase angle that is a deviation between a rotation phase reference of control and a rotation phase value of the motor, or a voltage phase limit value, is varied depending on a predetermined state quantity, and thereby the limit torque can be output.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Embodiments of the present invention will be described in detail below with reference to the drawings.

First Embodiment

Figure 1:
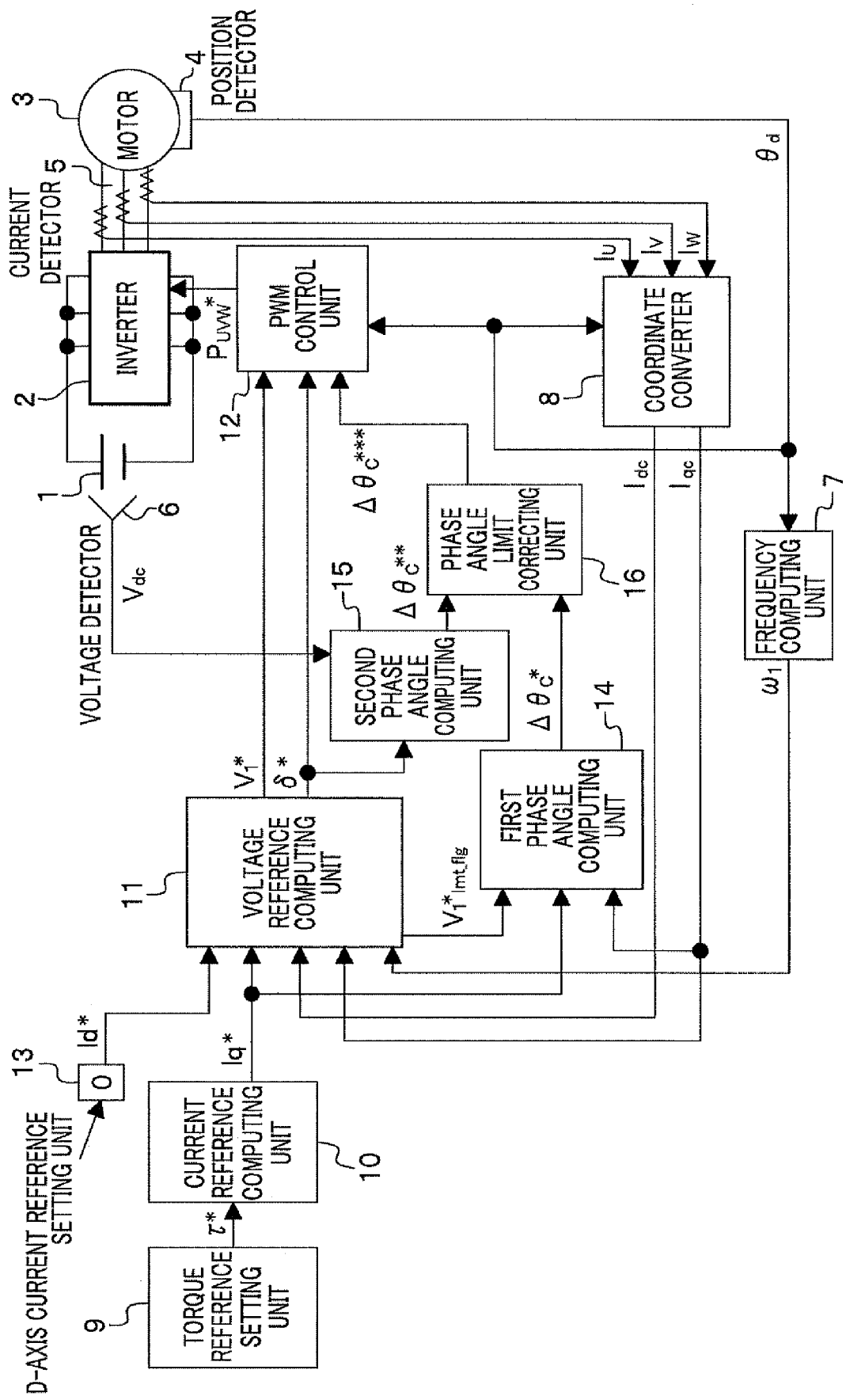
FIG. 1 is a block diagram of a motor control system according to a first embodiment of the present invention.

FIG. 1 shows a motor control system including a motor control apparatus according to a first embodiment of the present invention.

In FIG. 1, the motor control system includes a DC power supply 1 such as a battery for supplying electric power to an inverter 2; the inverter 2 for supplying three-phase AC power to a motor 3 according to three-phase PWM pulses $P_{uvw}*$; the motor 3; a position detector 4 such as an encoder, a resolver, or a magnetic pole position sensor; a current detector 5 to detect a three-phase AC current; and a voltage detector 6 to detect a power supply voltage $V_{dc}$ of the DC power supply 1 and a motor control apparatus.

The motor control apparatus includes a frequency computing unit 7 to compute a frequency value $\omega_1$ from a position detected value $\theta_d$ (rotational position of a rotor of the motor 3) detected by the position detector 4; a coordinate converter 8 to convert current values $I_u, I_v, I_w$ detected by the current detector 5 with the position detected value $\theta_d$ into a d-axis current detected value $I_{dc}$ and a q-axis current detected value $I_{qc}$; a torque reference setting unit 9 to set a torque reference $\tau*$; a current reference computing unit 10 to compute a q-axis current reference $I_q*$ from the torque reference $\tau*$; a voltage reference computing unit 11 to compute a first voltage reference $V_1*$, a first voltage phase reference $\delta*$, and a field weakening control flag $V_1*_{lmt\_flg}$ from a d-axis current reference $I_d^*$ set by a d-axis current reference setting unit 13, the q-axis current reference $I_q^*$, the d-axis current detected value $I_{dc}$, the q-axis current detected value $I_{qc}$, and the computed frequency value $\omega_1$ based on motor constants; a PWM control unit 12 to output the PWM pulses $P_{uvw}^*$ based on the first voltage reference $V_1^*$, the first voltage phase reference $\delta^*$, a third phase angle reference $\Delta\theta_c^{*}$ output by a phase angle limit correcting unit 16, and the position detected value $\theta_d$; a d-axis current reference setting unit 13** to set the d-axis current reference $I_d^*$ to zero; a first phase angle computing unit 14 to compute a first phase angle reference $\Delta\theta_c^*$ from the q-axis current reference $I_q^*$, the q-axis current detected value $I_{qc}$, and the field weakening control flag $V_1^*{}_{lmt\_flg}$; a second phase angle computing unit 15 to compute a second phase angle reference $\Delta\theta_c^{**}$ from the first voltage phase reference $\delta^*$ and the power supply voltage $V_{dc}$ detected by the voltage detector 6; and a phase angle limit correcting unit 16 to limit the first phase angle reference $\Delta\theta_c^*$ according to the second phase angle reference $\Delta\theta_c^{}$ to output the third phase angle reference $\Delta\theta_c^{*}$.

Figure 2:
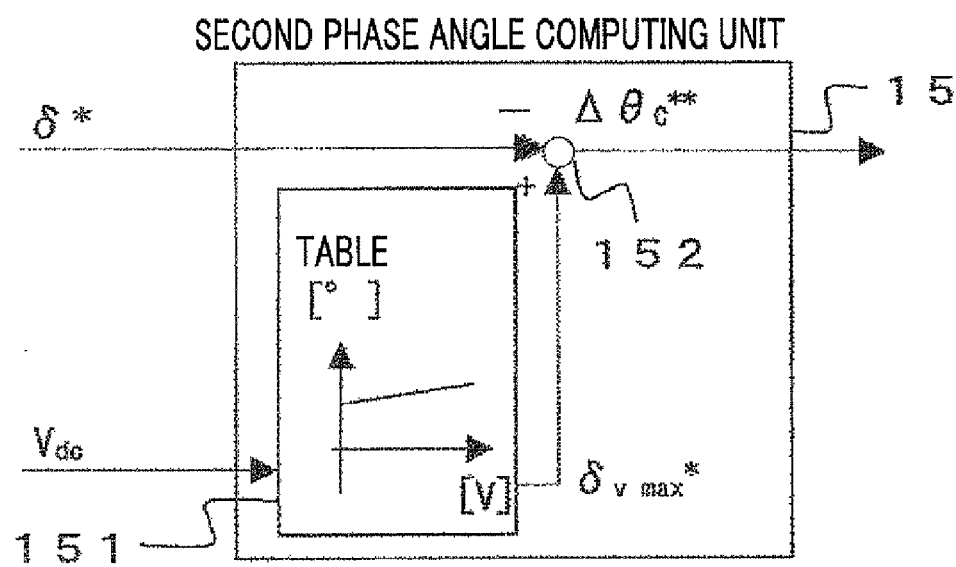
FIG. 2 is a block diagram of a second phase angle computing unit of FIG. 1.

FIG. 2 shows the second phase angle computing unit 15 in detail.

In FIG. 2, the second phase angle computing unit 15 includes a table 151 which, when the power supply voltage $V_{dc}$ is input, outputs a voltage phase limit value $\delta_{vmax}^*$ for which limit torque is output, and a subtracter 152 to subtract the first voltage phase reference $\delta^*$ from the voltage phase limit value $\delta_{vmax}^*$ to output the second phase angle reference $\Delta\theta_c^{**}$.

The operation of the field weakening control of the present embodiment will be described.

The voltage reference computing unit 11 comprises a current control unit that effects proportional plus integral control (PI control) of a deviation between the d-axis current reference $I_d^*$ and the d-axis current detected value $I_{dc}$, and a deviation between the q-axis current reference $I_q^*$ and the q-axis current detected value $I_{qc}$, thereby generating a second d-axis current reference $I_d^{}$ and a second q-axis current reference $I_q^{}$; a field oriented control computing unit that computes the first voltage reference $V_1^*$ and the first voltage phase reference $\delta^*$ from the second d-axis current reference $I_d^{}$, the second q-axis current reference $I_q^{}$, the computed frequency value $\omega_1$, and motor constant set values according to Eq. 1; and a field weakening control flag generator that sets the field weakening control flag $V_1^*{}_{lmt\_flg}$ according to Eq. 2 using the first voltage reference $V_1^*$.

$$\begin{pmatrix} V_d^* \\ V_q^* \end{pmatrix} = \begin{pmatrix} R^* & -\omega_1 \cdot L_q^* \\ \omega_1 \cdot L_d^* & R^* \end{pmatrix} \begin{pmatrix} I_d^{} \\ I_q^{} \end{pmatrix} + \begin{pmatrix} 0 \\ \omega_1 \cdot K_e^* \end{pmatrix} \quad \text{(Eq. 1)}$$

$$\begin{pmatrix} V_1^* \\ \delta^* \end{pmatrix} = \begin{pmatrix} \sqrt{V_d^{*2} + V_q^{*2}} \\ \tan^{-1}\left(-\dfrac{V_d^*}{V_q^*}\right) \end{pmatrix}$$

$$V_1^*{}_{lmt\_flg} = 0 \, (V_1^* < V_{1max}^*)$$

$$V_1^*{}_{lmt\_flg} = 1 \, (V_1^* \geq V_{1max}^*) \quad \text{(Eq. 2)}$$

where $V_d^*$ is a d-axis voltage reference, $V_q^*$ is a q-axis voltage reference, $R^*$ is a motor resistance set value, $L_d^*$ is a d-axis inductance set value, $L_q^*$ is a q-axis inductance set value, $K_e^*$ is an induced voltage constant set value, and $V_{1max}^*$ is a voltage reference limit.

The voltage reference limit $V_{1max}^*$ is a saturation value for the output voltage of the motor or the first voltage reference $V_1^*$.

When the field weakening control flag $V_1^*{}_{lmt\_flg}$ is at zero, the current control unit performs proportional plus integral computation. In contrast, when the field weakening control flag $V_1^*{}_{lmt\_flg}$ is at one, the current control unit stops the proportional plus integral computation (PI computation).

As shown in Eq. 3, the first phase angle computing unit 14, when the field weakening control flag $V_1^*{}_{lmt\_flg}$ is at zero, outputs the first phase angle reference $\Delta\theta_c^*$ at zero and, when the field weakening control flag $V_1^*{}_{lmt\_flg}$ is at one, performs the proportional plus integral computation based on the deviation between the q-axis current reference $I_q^*$ and the q-axis current detected value $I_{qc}$ to compute the first phase angle reference $\Delta\theta_c^*$.

$$\Delta\theta_c^* = 0 \quad (V_1^*{}_{lmt\_flg} = 0) \quad \text{(Eq. 3)}$$

$$\Delta\theta_c^* = \frac{K_p s + K_i}{s}(I_q^* - I_{qc}) \quad (V_1^*{}_{lmt\_flg} = 1)$$

where $K_p$ is a proportion gain and $K_i$ is an integration gain.

Figure 3:
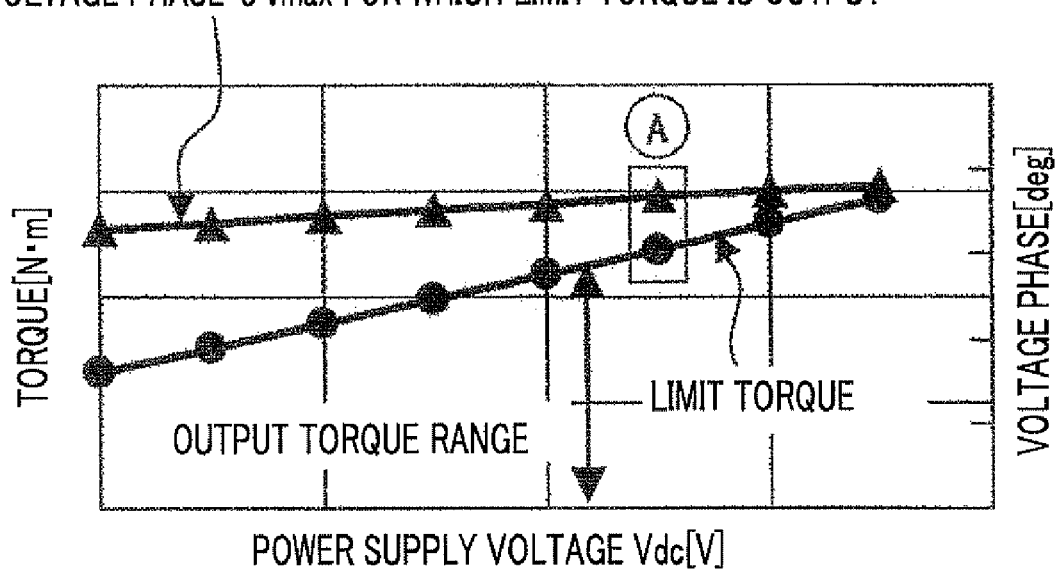
FIG. 3 is a chart showing characteristics of limit torque and a corresponding voltage phase against power supply voltage.

The second phase angle computing unit 15 determines a voltage phase $\delta_{vmax}$ for which limit torque is output from the table 151 of FIG. 2 according to the power supply voltage $V_{dc}$ and outputs the voltage phase $\delta_{vmax}$ as the voltage phase limit value $\delta_{vmax}^*$. FIG. 3 shows the characteristics of the limit torque and the corresponding voltage phase $\delta_{vmax}$ against the power supply voltage $V_{dc}$ when motor speed is constant. The limit torque varies with the power supply voltage $V_{dc}$, and the voltage phase $\delta_{vmax}$ corresponding to the limit torque also varies with the power supply voltage $V_{dc}$. The subtracter 152 subtracts the first voltage phase reference $\delta^*$ from the voltage phase limit value $\delta_{vmax}^*$ according to Eq. 4 to output the second phase angle reference $\Delta\theta_c^{**}$.

$$\Delta\theta_c^{**} = \delta_{vmax} - \delta^* \quad \text{(Eq. 4)}$$

The phase angle limit correcting unit 16 limits the first phase angle reference $\Delta\theta_c^*$ by the second phase angle reference $\Delta\theta_c^{}$ to output the third phase angle reference $\Delta\theta_c^{*}$.

The PWM control unit 12 generates a second voltage phase reference $\delta^{**}$ from the first voltage phase reference $\delta^*$ and the third phase angle reference $\Delta\theta_c^{***}$ according to Eq. 5 and outputs the PWM pulses $P_{uvw}^*$ proportional to three-phase voltage references $V_u^*, V_v^*, V_w^*$ computed from Eq. 6.

$$\delta^{**} = \delta^* + \Delta\theta_c^{***} \quad \text{(Eq. 5)}$$

$$\begin{pmatrix} V_u^* \\ V_v^* \\ V_w^* \end{pmatrix} = \begin{pmatrix} 1 & 0 \\ -\dfrac{1}{2} & \dfrac{\sqrt{3}}{2} \\ -\dfrac{1}{2} & -\dfrac{\sqrt{3}}{2} \end{pmatrix} \begin{pmatrix} \cos(\theta_d) & -\sin(\theta_d) \\ \sin(\theta_d) & \cos(\theta_d) \end{pmatrix} \begin{pmatrix} V_1^* \cdot \cos(\delta^{**}) \\ V_1^* \cdot \sin(\delta^{**}) \end{pmatrix} \quad \text{(Eq. 6)}$$

The three-phase voltage references $V_u^*, V_v^*, V_w^*$ may be generated by obtaining voltage references $V_\alpha^*$ and $V_\beta^*$ in fixed coordinates from the first voltage reference $V_1^*$, the first voltage phase reference $\delta^*$, and the position detected value $\theta_d$ and advancing them in phase by the third phase angle reference $\Delta\theta_c^{***}$ as shown in Eq. 7.

$$\begin{pmatrix} V_\alpha^* \\ V_\beta^* \end{pmatrix} = \begin{pmatrix} \cos(\theta_d) & -\sin(\theta_d) \\ \sin(\theta_d) & \cos(\theta_d) \end{pmatrix} \begin{pmatrix} -V_1^* \cdot \sin(\delta^*) \\ V_1^* \cdot \cos(\delta^*) \end{pmatrix} \quad \text{(Eq. 7)}$$

$$\begin{pmatrix} V_u^* \\ V_v^* \\ V_w^* \end{pmatrix} = \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} V_\alpha^* \\ V_\beta^* \end{pmatrix} \begin{pmatrix} \sin(\Delta\theta_c^{*}) & -\sin(\Delta\theta_c^{*}) \\ \sin(\Delta\theta_c^{*}) & \cos(\Delta\theta_c^{*}) \end{pmatrix}$$

In order to describe a method of determining the voltage phase limit value $\delta_{vmax}^*$, FIG. 3 shows the characteristics of the limit torque and the corresponding voltage phase $\delta_{vmax}$ against the power supply voltage $V_{dc}$. As shown in FIG. 3, the limit torque varies with the power supply voltage $V_{dc}$, and the voltage phase $\delta_{vmax}$ for which the limit torque is output also varies with the power supply voltage $V_{dc}$.

Hence, if the torque reference $\tau^*$ specifies torque above the limit torque, the second voltage phase reference $\delta^{**}$ is set equal to the voltage phase limit value $\delta_{vmax}^*$ according to Eq. 4 and Eq. 5, and thus the limit torque is output. If the torque reference $\tau^*$ specifies torque at or below the limit torque, then the second voltage phase reference $\delta^{**}$ is smaller than the voltage phase limit value $\delta_{vmax}^*$, and hence torque as specified by the torque reference $\tau^*$ can be output.

The advantageous effects of the present invention will be described using FIGS. 4 and 5.

Figure 4A:
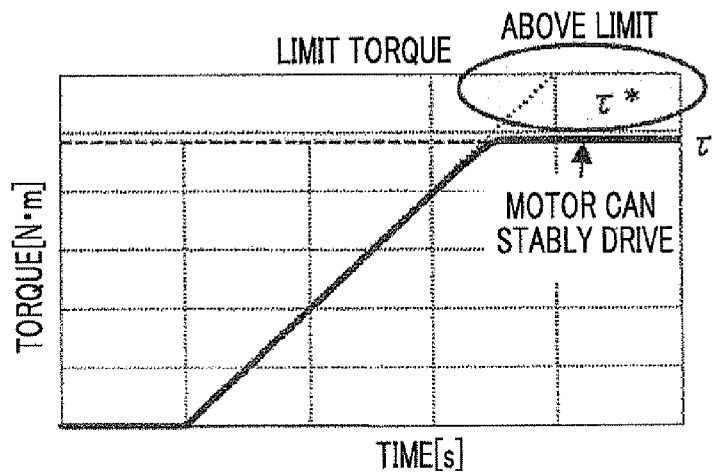
FIGS. 4A and 4B are charts showing output torque and phase angle references for the situation where at point A of FIG. 3, a torque reference increases in ramp above the limit torque value.
Figure 4B:
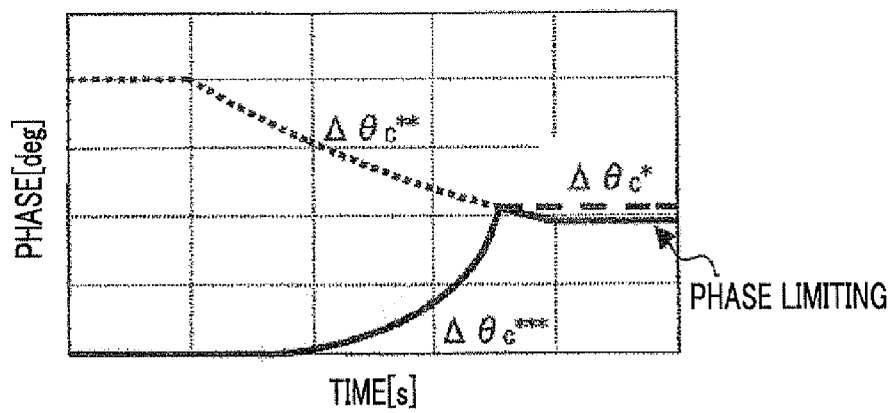

FIG. 4A shows the torque reference $\tau^*$ and output torque $\tau$ for the situation where at point A of FIG. 3, the torque reference $\tau^*$ increases in ramp above the limit torque value with time. FIG. 4B shows the first phase angle reference $\Delta\theta_c^*$, the second phase angle reference $\Delta\theta_c^{}$, and the third phase angle reference $\Delta\theta_c^{*}$ for the same time period. In FIG. 4A, even when the torque reference $\tau^*$ goes above the limit torque value, the motor can stably drive. At this time, as shown in FIG. 4B, the first phase angle reference $\Delta\theta_c^*$ (denoted by the broken line) is limited to the second phase angle reference $\Delta\theta_c^{}$ (the dotted line), and hence the third phase angle reference $\Delta\theta_c^{*}$ (the solid line) can be controlled stably.

Figure 5:
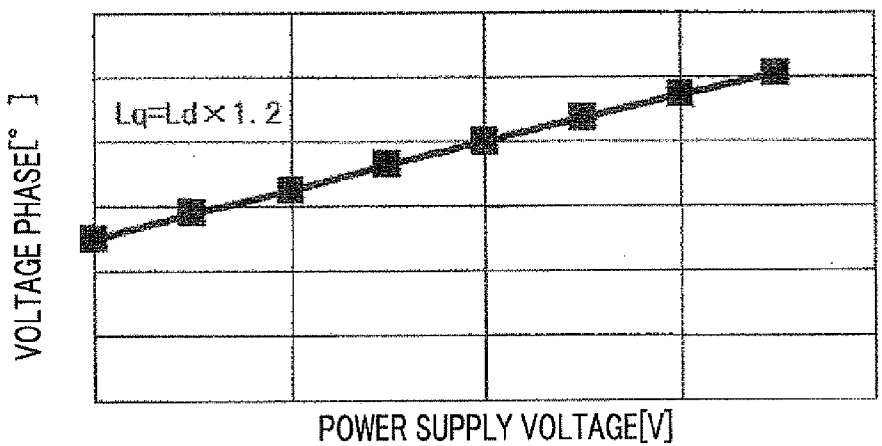
FIG. 5 is a chart showing a characteristic of a voltage phase for which the limit torque is output against the power supply voltage.

FIG. 5 shows the characteristic of the voltage phase $\delta_{vmax}$ for which the limit torque is output against the power supply voltage $V_{dc}$ for the case where the ratio of the d-axis inductance $L_d$ to the q-axis inductance $L_q$ is at 1.2 (a salient pole motor). As seen from FIG. 5, in the case of the salient pole motor, as the power supply voltage $V_{dc}$ increases, the voltage phase $\delta_{vmax}$ for which the limit torque is output increases substantially linearly, and hence the voltage phase limit value $\delta_{vmax}^*$ may be set to be increased as the power supply voltage $V_{dc}$ becomes higher.

Although in FIG. 1 the voltage detector 6 is depicted to measure the power supply voltage between the ends of the power supply, the voltage between terminals of an electric control module (electric control unit (ECU)) comprising a microcomputer and electronic control components or the voltage between terminals of the motor may be measured, resulting in the same effect.

Furthermore, in the situation where the power supply voltage $V_{dc}$ has dropped to a predetermined value or lower, or the power supply voltage $V_{dc}$ has dropped to near the minimum drive compensation voltage of the inverter because, e.g., the generating capacity of the alternator runs short, the voltage drop between the DC power supply 1 and the motor 3 will increases when the primary current flowing through the motor 3 increases, thus decreasing the motor supply voltage. As a result, the motor supply voltage becomes lower than the minimum drive compensation voltage of the inverter, and thus the system may stop.

In such a case, the phase angle limit correcting unit 16 sets the third phase angle reference $\Delta\theta_c^{***}$ to zero or holds it at the value corresponding to the minimum drive compensation voltage to restrict the amount of the primary current $I_1$, and thereby the system can be prevented from stopping.

Here the predetermined value of the power supply voltage $V_{dc}$ is set to (a) the sum of the inverter drive compensation voltage and the maximum voltage drop across the power supply line for the motor if the ECU terminal voltage or the battery terminal voltage is measured, and (b) the inverter drive compensation voltage if the motor terminal voltage is measured. Because the inverter drive compensation voltage is usually determined by the way that the driver is designed such as the minimum voltage required for the charge pump of the pre-driver circuit, and the selection of components, the inverter drive compensation voltage is set according to those things.

Figure 6:
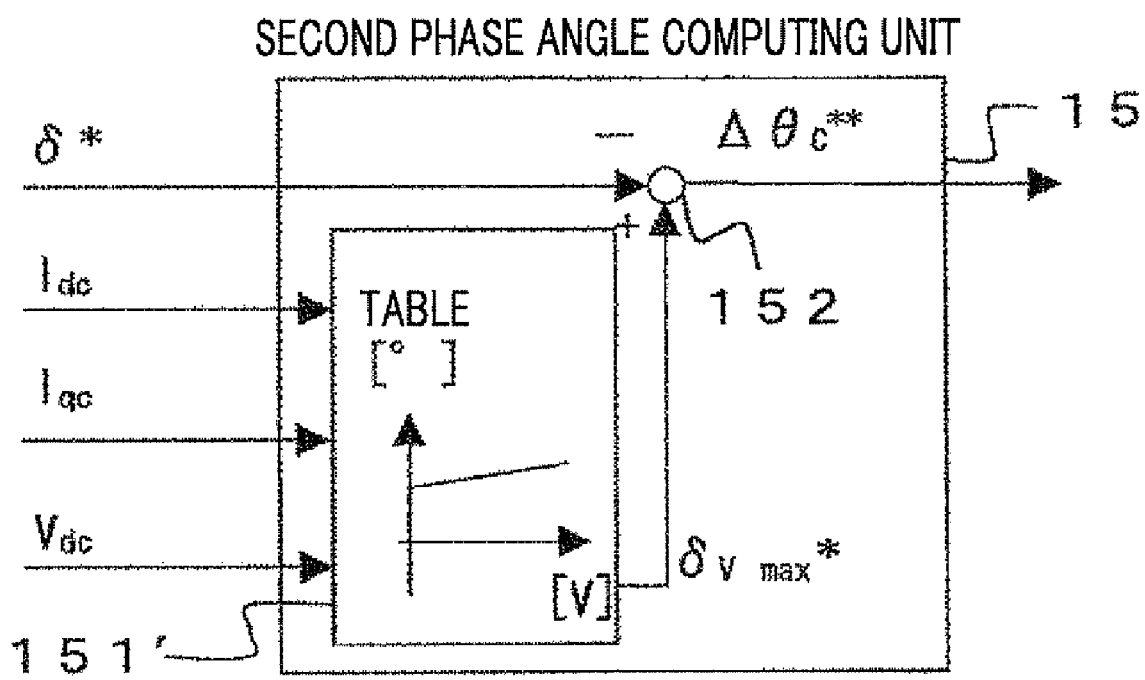
FIG. 6 is a block diagram of another second phase angle computing unit in FIG. 1.

Moreover, it is known that, when the power supply voltage $V_{dc}$ drops, the primary current $I_1$ increases. Accordingly, the second phase angle computing unit 15 may control such that the primary current does not exceed an upper limit value $I_{1max}$ using FIG. 6 instead of FIG. 2 when the power supply voltage $V_{dc}$ has dropped. In the table 151' of FIG. 6, the detected primary current value $I_1$ is generated using the d-axis current detected value $I_{dc}$ and the q-axis current detected value $I_{qc}$ and compared with the upper limit value $I_{1max}$ set beforehand in the table. If the primary current value $I_1$ is smaller than the upper limit value $I_{1max}$, the voltage phase $\delta_{vmax}$ for which the limit torque is output is output as the voltage phase limit value $\delta_{vmax}^*$. In contrast, if the primary current value $I_1$ exceeds the upper limit value $I_{1max}$, a restricted voltage phase $\delta_{vmax}$ is output as the voltage phase limit value $\delta_{vmax}^*$.

Alternatively, in the table 151 of the second phase angle computing unit 15, the voltage phase limit value $\delta_{vmax}^*$ may be corrected linearly. In particular, in the case of a motor having a small salient pole ratio where the deviation between the d-axis inductance and the q-axis inductance is at or below a predetermined value, the voltage phase limit value $\delta_{vmax}^*$ may be corrected linearly.

In order to prevent the detected value of the power supply voltage $V_{dc}$ from being affected by noise or variation in the power supply voltage to produce variation in torque in this control, a filter may be inserted in the power supply line.

Figure 19:
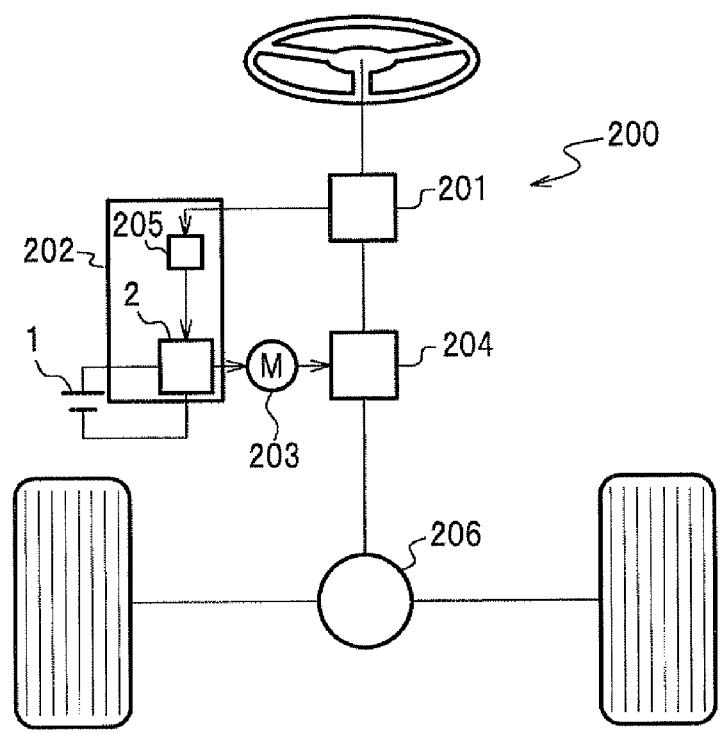
FIG. 19 is a block diagram of an electric power steering using the motor control system including a motor control apparatus according to any of the first to sixth embodiments.

FIG. 19 shows an electric power steering using the motor control system including the motor control apparatus according to the first embodiment.

The electric power steering 200 includes: a torque sensor 201 attached to a steering shaft coupled to a steering wheel for detecting a torque in the steering shaft caused by the rotated steering; an ECU (electronic control unit) 202 or an electric control module including the inverter 2; the battery 1 of, for example, a motor vehicle; a motor 203 (for example a salient pole motor) driven by the inverter 2; and a coupling gear 204 for transmitting the rotation force to the steering shaft at a predetermined coupling gear ratio to add an assist force to a force applied to the steering shaft by a driver rotating the steering wheel.

The ECU (electronic control unit) 202 ECU includes: for example, a computer 205; interface circuits (not shown); and the inverter 2. The ECU 202 determines the torque reference $\tau$ in response to the torque magnitude detected by the torque sensor 201, sets the d-axis current reference $I_d^*$ to zero, and generates the three-phase PWM pulses $P_{uvw}^*$. The inverter 2 in the ECU supplied with the three-phase PWM pulses $P_{uvw}^*$ and the electric power from the battery 1 supplies three-phase drive signals to the motor 203.

The assisted steering torque is transmitted to a rack and pinion mechanism 206 to steer wheels of the motor vehicle. FIG. 19 shows a column assist type of electric power steering. However, the motor control system including the motor control apparatus according to the first embodiment is also applicable to, for example, a pinion assist type of electric power steering and a rack assist type of electric power steering. In addition, the motor control system including the motor control apparatus according to the second to the sixth embodiments are also applicable to such electric power steering apparatus in, for example, a motor vehicle.

Second Embodiment

Figure 7:
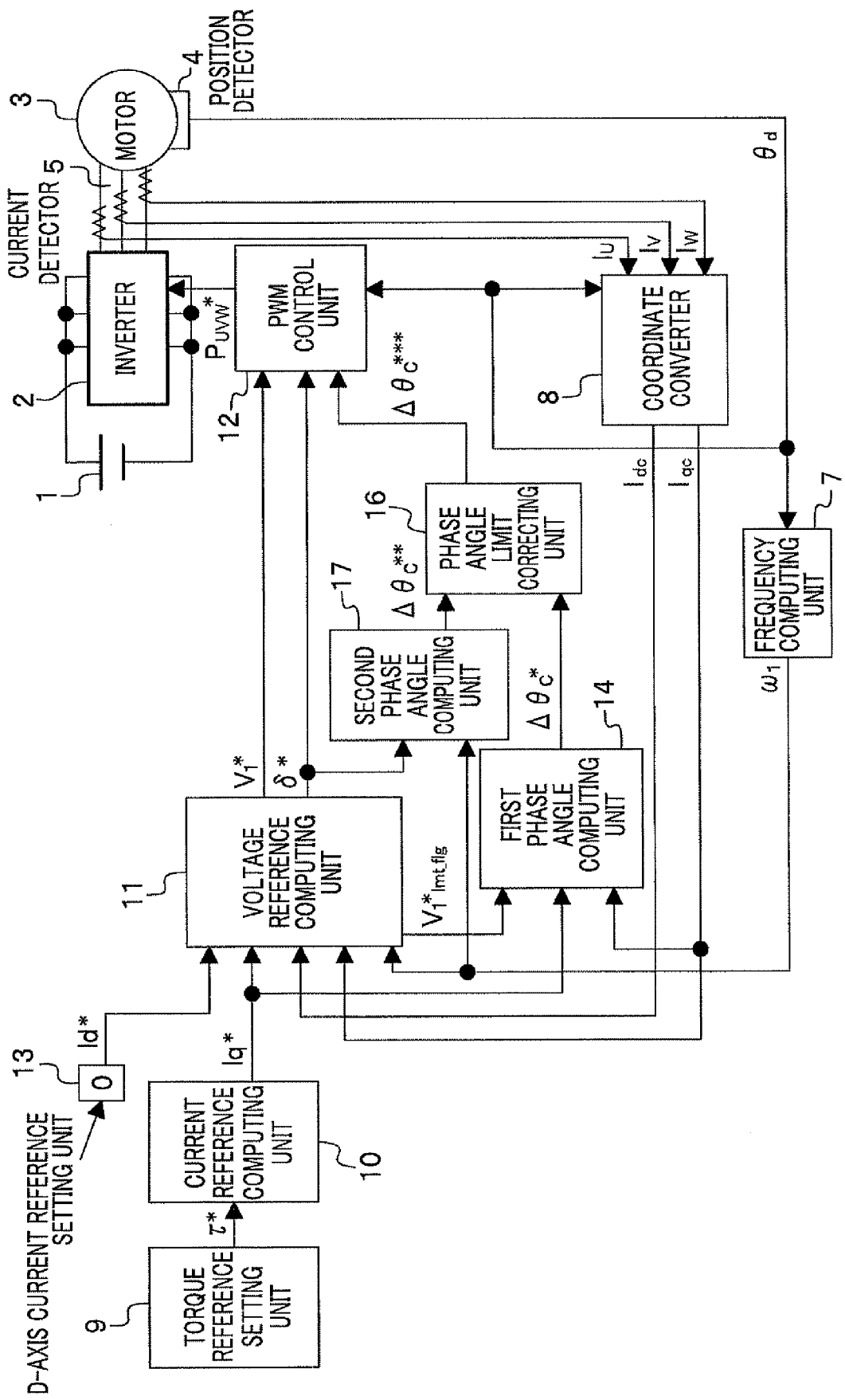
FIG. 7 is a block diagram of a motor control system according to a second embodiment.

FIG. 7 shows a motor control system including a motor control apparatus according to a second embodiment of the present invention. Description of the blocks 1 to 5, 7 to 14, and 16 that are the same as in the first embodiment will be omitted. Although the second phase angle computing unit 15 of the first embodiment computes the second phase angle reference $\Delta\theta_c^{}$ based on the power supply voltage $V_{dc}$, the second phase angle computing unit 17 of the present embodiment computes the second phase angle reference $\Delta\theta_c^{}$ based on the computed frequency value $\omega_1$.

The configuration and operation of the second phase angle computing unit 17 will be described in detail using FIG. 8.

Figure 8:
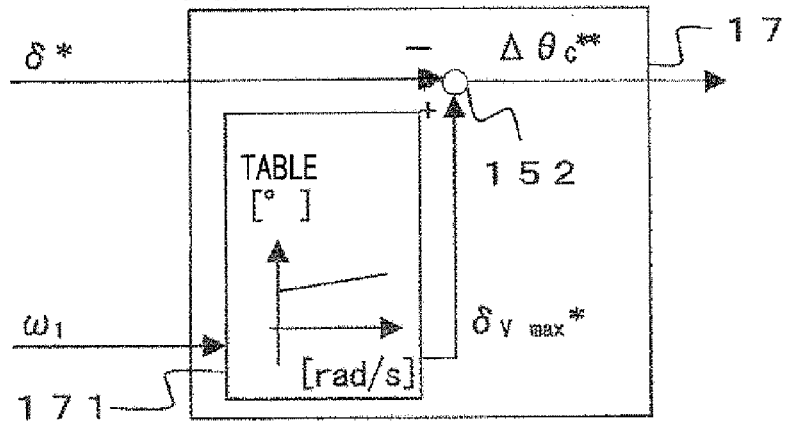
FIG. 8 is a block diagram of a second phase angle computing unit in FIG. 7.

The voltage phase limit value $\delta_{vmax}^*$ is set to the voltage phase $\delta_{vmax}$ for which the limit torque is output, corresponding to the computed frequency value $\omega_1$ with use of the table 171 of FIG. 8. The subtracter 152 subtracts the first voltage phase reference $\delta^*$ from the voltage phase limit value $\delta_{vmax}^*$ according to Eq. 4 to output the second phase angle reference $\Delta\theta_c^{**}$.

Figure 9:
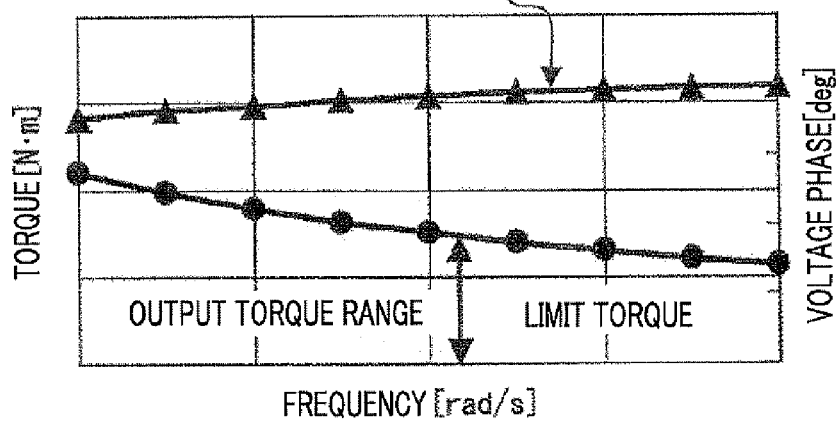
FIG. 9 is a chart showing characteristics of limit torque and a corresponding voltage phase against frequency.

In order to describe the way to determine the voltage phase limit value $\delta_{vmax}^*$, FIG. 9 shows the characteristics of the limit torque and the corresponding voltage phase $\delta_{vmax}$ against the computed frequency value $\omega_1$. If the torque reference $\tau^*$ specifies torque above the limit torque, the second voltage phase reference $\delta^{**}$ is set equal to the voltage phase limit value $\delta_{vmax}^*$ according to Eq. 4 and Eq. 5, and thus the limit torque is output. If the torque reference $\tau^*$ specifies torque at or below the limit torque, then the second voltage phase reference $\delta^{**}$ is smaller than the voltage phase limit value $\delta_{vmax}^*$, and hence torque as specified by the torque reference $\tau^*$ can be output.

Figure 10:
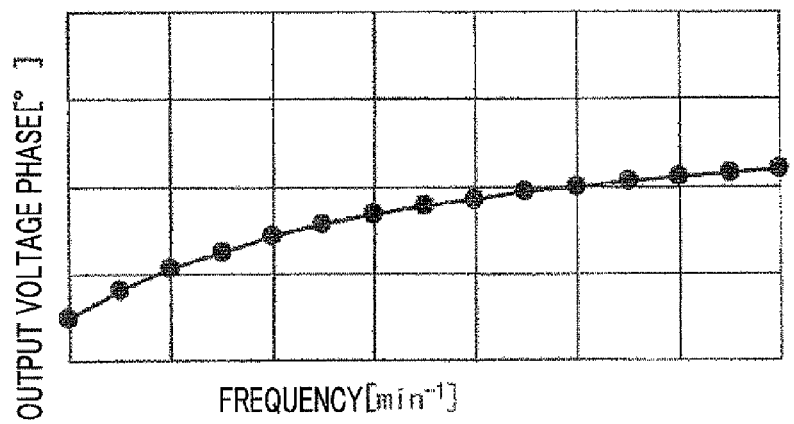
FIG. 10 is a chart showing a characteristic of a voltage phase for which limit torque is output, against frequency.

Advantageous effects of the present embodiment will be described using the characteristic of the voltage phase $\delta_{vmax}$ for which the limit torque is output, against the frequency shown in FIG. 10. It is seen from FIG. 10 that as the computed frequency value $\omega_1$ becomes higher, the voltage phase $\delta_{vmax}$ for which the limit torque is output increases. Hence, the voltage phase limit value $\delta_{vmax}^*$ may be set to be increased as the computed frequency value $\omega_1$ becomes higher.

Moreover, in the case of a motor where the ratio of the d-axis inductance $L_d$ to the q-axis inductance $L_q$ is at a value of 0.8 to 1.2 and of which the reluctance torque is small and the salient-pole property is negligible, the voltage phase limit value $\delta_{vmax}^*$ can be derived from Eq. 8 instead of the table 171 of the second phase angle computing unit 17.

The voltage equation for a motor is expressed by Eq. 8.

$$\begin{pmatrix} V_d \\ V_q \end{pmatrix} = \begin{pmatrix} R & -\omega_r \cdot L \\ \omega_r \cdot L & R \end{pmatrix} \begin{pmatrix} I_d \\ I_q \end{pmatrix} + \begin{pmatrix} 0 \\ \omega_r \cdot K_e \end{pmatrix} \quad \text{(Eq. 8)}$$

where $V_d$ is a d-axis motor voltage, $V_q$ is a q-axis motor voltage, $\omega_r$ is the rotation frequency of the motor, R is the resistance of the motor, L is the inductance of the motor, $I_d$ is a d-axis motor current, $I_q$ is a q-axis motor current, and $K_e$ is an induced voltage constant.

Note that, in the case of the motor of which the salient-pole property is negligible, because d-axis inductance $L_d$ and q-axis inductance $L_q$ are equal, the inductance L of the motor is used.

Let $V_1^*{}_{lmt}$ be the maximum voltage that the motor can output. The maximum voltage can be expressed by Eq. 9.

$$\sqrt{V_d^2+V_q^2}=V_1^*{}_{lmt} \quad \text{(Eq. 9)}$$

The output torque $\tau$ can be expressed by Eq. 10.

$$\tau = \frac{3P_m}{2}K_e I_q \quad \text{(Eq. 10)}$$

where $P_m$ is the number of magnetic pole pairs of the motor.

Further, an output voltage phase $\delta_v$ satisfies Eq. 11.

$$\delta_v \cong \frac{\pi}{2} + \frac{V_q}{V_d} \quad \text{(Eq. 11)}$$

Figure 11:
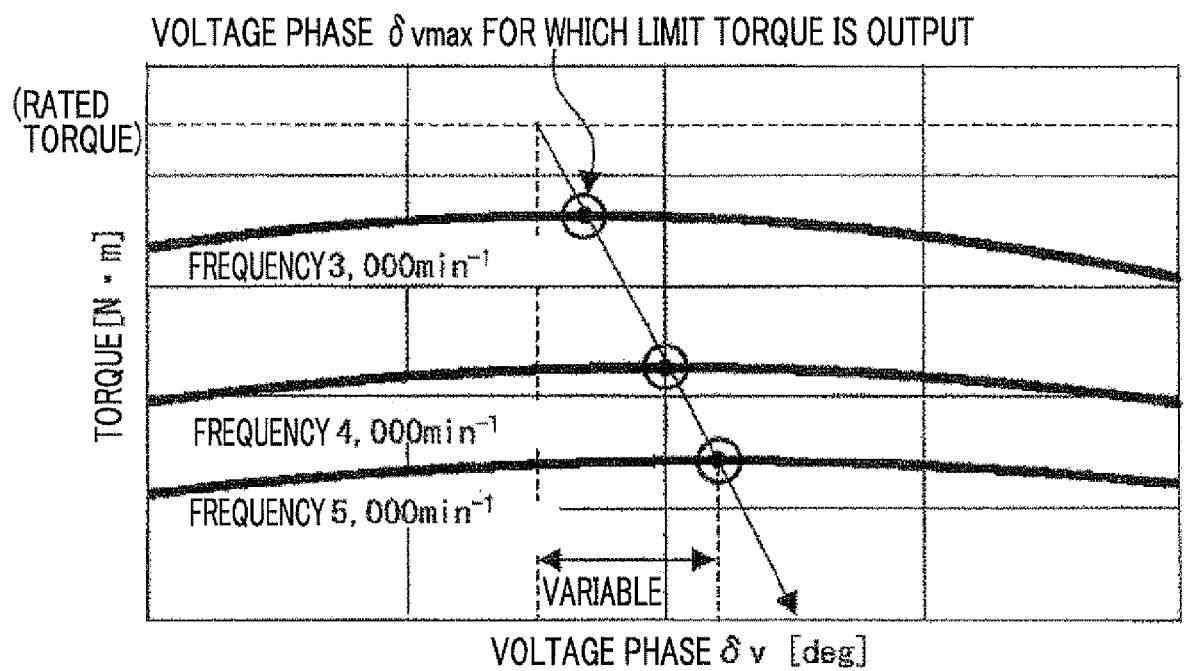
FIG. 11 is a chart showing a characteristic of torque against the voltage phase with the frequency as a parameter.

FIG. 11 shows the characteristic of the torque against the voltage phase with the frequency as a parameter (3,000 min$^{-1}$, 4,000 min$^{-1}$, 5,000 min$^{-1}$). The voltage phase limit value $\delta_{vmax}^*$ is set to the voltage phase $\delta_{vmax}$, for which the limit torque is output as shown in FIG. 11. Here the voltage phase limit value $\delta_{vmax}^*$ varies depending on the frequency. The output torque exhibits an upward-curved characteristic against the voltage phase $\delta_v$ regardless of the frequency. Hence, when differentiating the output torque $\tau$ with respect to the voltage phase $\delta_v$ to obtain the voltage phase value at which the derivative equals zero (=the voltage phase $\delta_{vmax}$, for which the limit torque is output), at that voltage phase value the output torque $\tau$ is maximal. By differentiating the output torque $\tau$ with respect to the voltage phase $\delta_v$ and substituting Eq. 11, Eq. 12 is obtained.

$$\frac{d\tau}{d\delta_v} = \frac{d\tau}{d\left(\frac{V_q}{V_d}\right)} \quad \text{(Eq. 12)}$$

Substitution is effected in Eq. 10 with Eq. 8 and Eq. 9, and Eq. 13 is derived from Eq. 12 and Eq. 10.

$$\frac{d\tau}{dx} = \quad \text{(Eq. 13)}$$
$$\frac{d}{dx}\left(\frac{3P_m}{2(R^2+\omega_r^2 L^2)^2} \cdot \left(\frac{K_e V_1^*{}_{lmt}}{\sqrt{x^2+1}}(-Rx+\omega_r L)-\omega_r R K_e^2\right)\right)=0$$

where x represents $V_q/V_d$.

Solving Eq. 13 for x, Eq. 14 is obtained.

$$x = -\frac{R}{\omega_r L} \quad \text{(Eq. 14)}$$

Substitution of $V_q/V_d$ in Eq. 11 with Eq. 14 provides the voltage phase $\delta_{vmax}$, for which the limit torque is output in Eq. 15. Note that the computed frequency value $\omega_1$ may be used instead of the rotation frequency $\omega_r$ of the motor.

$$\delta_{vmax} = \frac{\pi}{2} - \frac{R}{\omega_r L} \quad \text{(Eq. 15)}$$

Hence, in the case of a motor having a negligible salient-pole property, in which the ratio of the d-axis inductance $L_d$ to the q-axis inductance $L_q$ is at a value of 0.8 to 1.2 and thus the reluctance torque is small, the voltage phase limit value $\delta_{vmax}*$ may be set to a value calculated from Eq. 15 instead of the table 171, resulting in the same effect.

Further, as seen from Eq. 15, the voltage phase limit value $\delta_{vmax}*$ varies with the magnitude of the resistance R of the motor, and hence the resistance R in Eq. 15 may be corrected according to the measured temperature of the motor.

Yet further, in the condition where for the computed frequency value $\omega_1$ of the motor, the required torque is at or below the limit torque of the motor, the phase angle limit correcting unit 16 may control the third phase angle reference $\Delta\theta_c***$ to be fixed at zero in view of the motor efficiency.

Also, in the condition where for the computed frequency value $\omega_1$ of the motor, the required torque is at or above the limit torque of the motor, the third phase angle reference $\Delta\theta_c***$ may be reduced to become such a phase correction value as to produce good torque efficiency in view of the motor output efficiency.

Further in the electric power steering using the motor control system including the motor control apparatus according to the second embodiment, the frequency of the output shaft of the motor providing steering assistive power and the steering speed of the steering mechanism are detected, and a value of the detected frequency multiplied by the coupling gear ratio between the steering mechanism and the motor can be used instead of the computed frequency value $\omega_1$ computed in the frequency computing unit 7, resulting in the same effect. Or, a frequency estimate value $\omega_{1c}$ estimated from the first voltage reference $V_1*$, the first voltage phase reference $\delta*$, the d-axis current detected value $I_{dc}$, and the q-axis current detected value $I_{qc}$ may be used instead of the computed frequency value $\omega_1$, resulting in the same effect. Or, a frequency reference given by an upper level may be input to the second phase angle computing unit 17, resulting in the same effect.

Third Embodiment

Figure 12:
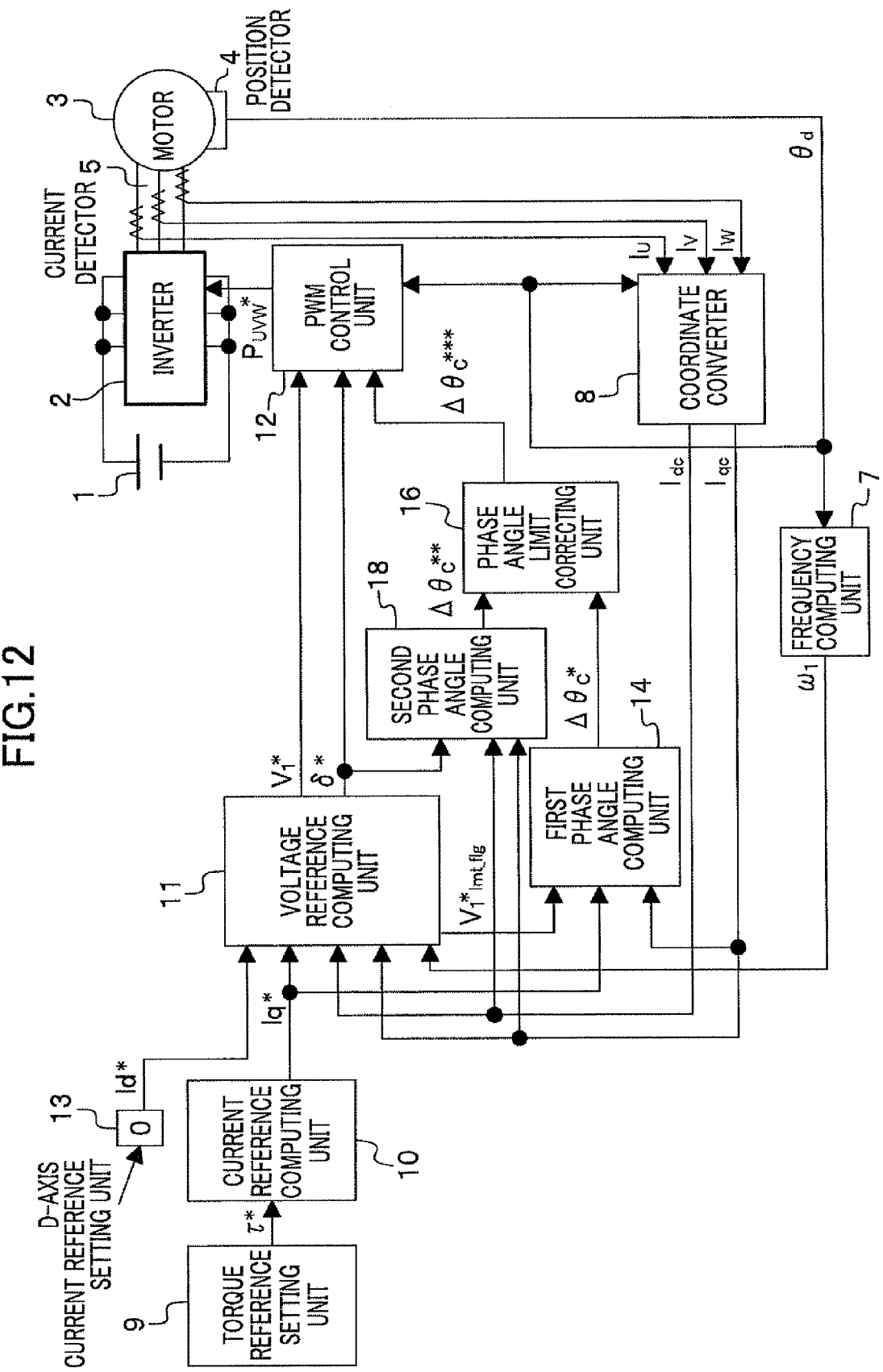
FIG. 12 is a block diagram of a motor control system according to a third embodiment.

FIG. 12 shows a motor control system including a motor control apparatus according to a third embodiment of the present invention. Description of the blocks 1 to 5, 7 to 14, and 16 that are the same as in the first embodiment will be omitted. Although the second phase angle computing unit 15 of the first embodiment computes the second phase angle reference $\Delta\theta_c$ based on the power supply voltage $V_{dc}$ from the voltage detector 6 detecting the voltage of the DC power supply 1, the second phase angle computing unit 18 of the present embodiment computes the second phase angle reference $\Delta\theta_c$ based on the d-axis current detected value $I_{dc}$ and the q-axis current detected value $I_{qc}$.

Figure 13:
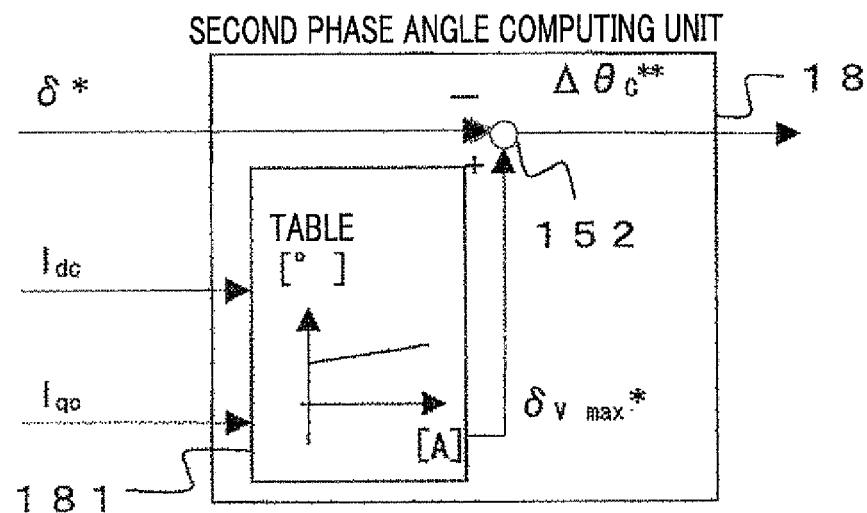
FIG. 13 is a block diagram of a second phase angle computing unit in FIG. 12.

The detailed block diagram of the second phase angle computing unit 18 is shown in FIG. 13. The table 181 obtains the voltage phase limit value $\delta_{vmax}*$ based on the d-axis current detected value $I_{dc}$ and the q-axis current detected value $I_{qc}$. The subtracter 152 subtracts the first voltage phase reference $\delta*$ from the voltage phase limit value $\delta_{vmax}*$ according to Eq. 4 to output the second phase angle reference $\Delta\theta_c**$.

Figure 14:
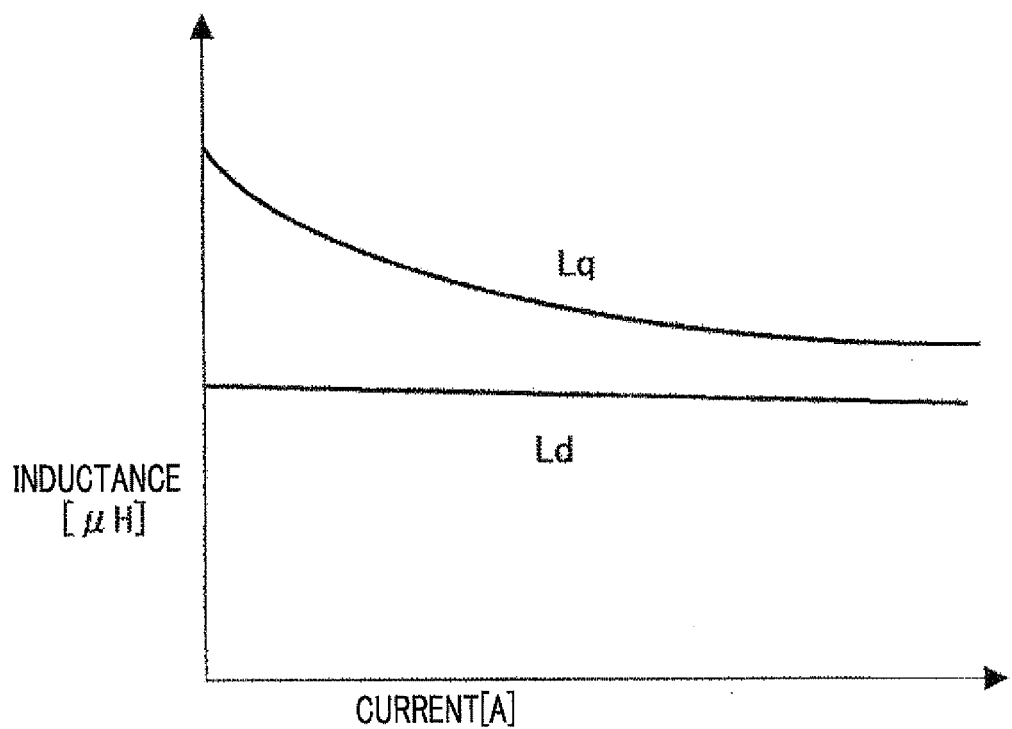
FIG. 14 is a chart showing a characteristic of the motor inductance against a motor current.

An advantageous effect of the present embodiment will be described using FIG. 14. FIG. 14 shows the characteristic of the motor inductance against the motor current. As shown in FIG. 14, it is known that as the motor current increases, the q-axis inductance decreases. If the d-axis inductance and/or the q-axis inductance vary, the output voltage varies according to Eq. 16.

$$\begin{pmatrix} V_d \\ V_q \end{pmatrix} = \begin{pmatrix} R & -\omega_r \cdot \hat{L}_d \\ \omega_r \cdot \hat{L}_d & R \end{pmatrix} \begin{pmatrix} I_d \\ I_q \end{pmatrix} \begin{pmatrix} 0 \\ \omega_r \cdot K_e \end{pmatrix} \quad \text{(Eq. 16)}$$

where $\hat{L_d}$ is an estimated value of the d-axis inductance having varied with the motor current, and $\hat{L_q}$ is an estimated value of the q-axis inductance having varied with the motor current.

When the output voltage varies, the voltage phase $\delta_{vmax}$, for which the limit torque is output, also varies according to Eq. 16, and hence a table 181 is supplied with the d-axis current detected value $I_{dc}$ and the q-axis current detected value $I_{qc}$ and estimates the inductance values and corrects the voltage phase limit value $\delta_{vmax}*$ according to the estimated inductance values.

Also the configuration of the present embodiment can output the limit torque because, if the torque reference $\tau*$ specifies torque above the limit torque, the second voltage phase reference $\delta**$ is set equal to the voltage phase limit value $\delta_{vmax}*$ according to Eq. 4 and Eq. 5, and thus the limit torque is output. If the torque reference $\tau*$ specifies torque at or below the limit torque, then the second voltage phase reference $\delta**$ is smaller than the voltage phase limit value $\delta_{vmax}*$, and hence the configuration of the present embodiment can output the torque as specified by the torque reference $\tau*$.

Moreover, in the table 181 the d-axis current reference $I_d*$, the q-axis current reference $I_q*$, and the third phase angle reference $\Delta\theta_c***$ may be used for correction instead of the d-axis current detected value $I_{dc}$ and the q-axis current detected value $I_{qc}$, resulting in the same effect.

Note that the first to third embodiments can be used in any combination thereof.

Fourth Embodiment

Figure 15:
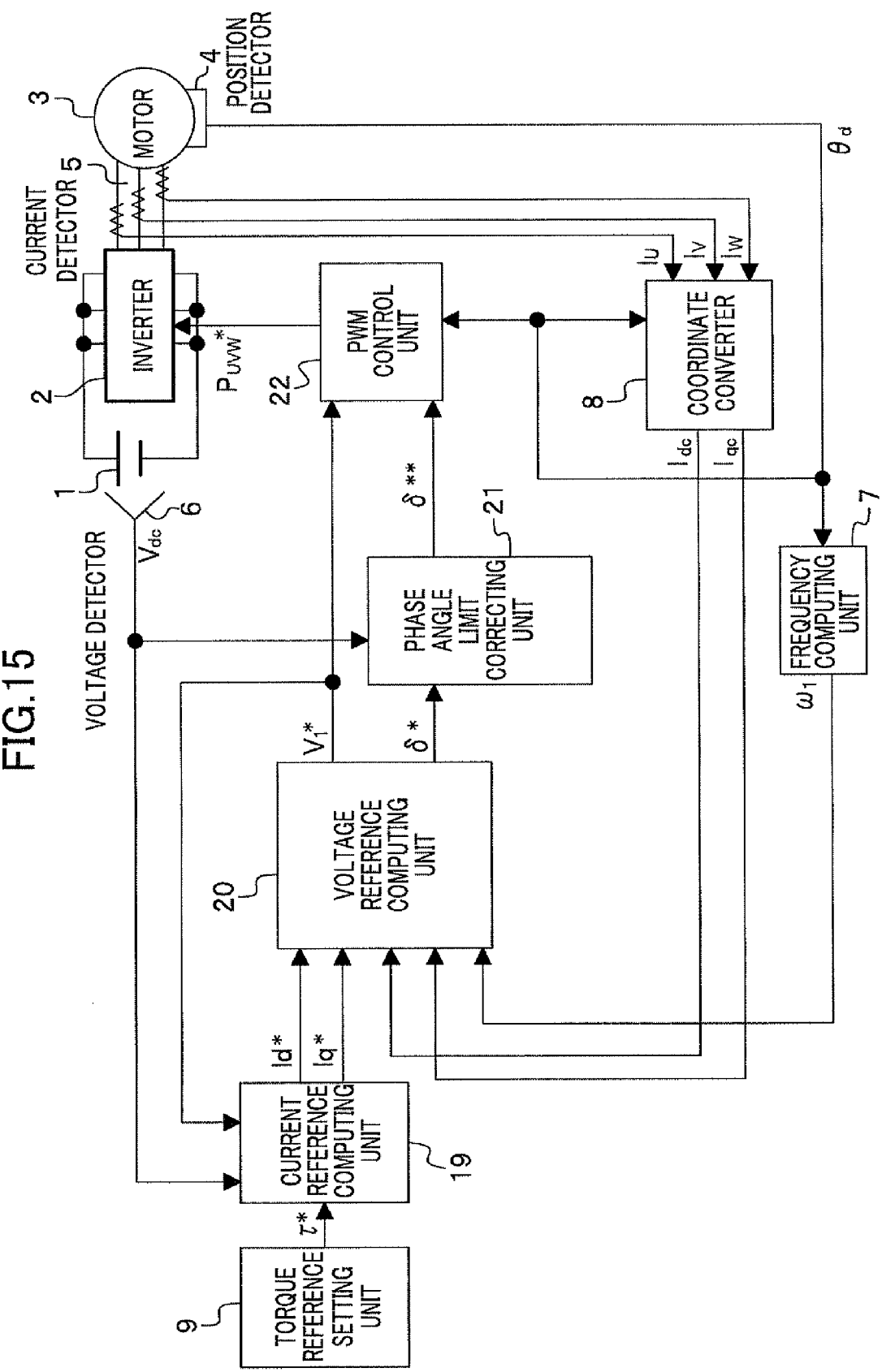
FIG. 15 is a block diagram of a motor control system according to a fourth embodiment.

FIG. 15 shows a motor control system including a motor control apparatus according to a fourth embodiment of the present invention. The motor control system includes the DC power supply 1, the inverter 2, the motor 3, the position detector 4, the current detector 5, the voltage detector 6, the frequency computing unit 7, the coordinate converter 8, and the torque reference setting unit 9, which are the same as in the first embodiment, and of which description will be omitted.

The motor control system further includes a current reference computing unit 19 to compute a d-axis current reference $I_d^*$ and a q-axis current reference $I_q^*$ from the torque reference $\tau^*$, a first voltage reference $V_1^*$, and the power supply voltage $V_{dc}$; a voltage reference computing unit 20 to compute the first voltage reference $V_1^*$ and a first voltage phase reference $\delta^*$ from the d-axis current reference $I_d^*$, the q-axis current reference $I_q^*$, the d-axis current detected value $I_{dc}$, the q-axis current detected value $I_{qc}$, and the computed frequency value $\omega_1$ based on motor constants; a phase angle limit correcting unit 21 to compute a second voltage phase reference $\delta^{**}$ from the first voltage phase reference $\delta^*$ and the power supply voltage $V_{dc}$; and a PWM control unit 22 to output the PWM pulses $P_{uvw}^*$ based on the first voltage reference $V_1^*$, the second voltage phase reference $\delta^{**}$, and the position detected value $\theta_d$.

The current reference computing unit 19 computes the q-axis current reference $I_q^*$ based on the torque reference $\tau^*$ and, in normal control, outputs the d-axis current reference $I_d^*$ at zero and, in field weakening control, computes such a value of the d-axis current reference $I_d^*$ that the first voltage reference $V_1^*$ equals the voltage reference limit $V_{1max}^*$.

The voltage reference computing unit 20 comprises a current control unit that effects the proportional plus integral controls (PI controls) for a deviation between the d-axis current reference $I_d^*$ and the d-axis current detected value $I_{dc}$, and a deviation between the q-axis current reference $I_q^*$ and the q-axis current detected value $I_{qc}$, thereby generating a second d-axis current reference $I_d^{}$ and a second q-axis current reference $I_q^{}$; and a field oriented control computing unit that computes the first voltage reference $V_1^*$ and the first voltage phase reference $\delta^*$ from the second d-axis current reference $I_d^{}$, the second q-axis current reference $I_q^{}$, the computed frequency value $\omega_1$, and motor constant set values according to Eq. 1.

Figure 16:
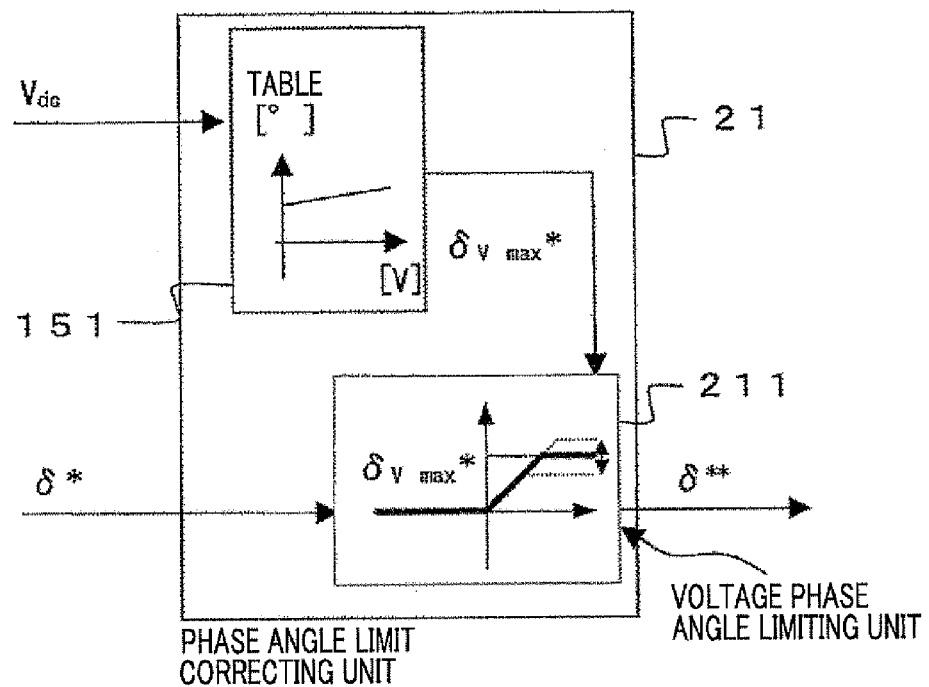
FIG. 16 is a block diagram of a phase angle limit correcting unit in FIG. 15.

The detailed block diagram of the phase angle limit correcting unit 21 is shown in FIG. 16.

The phase angle limit correcting unit 21 comprises the table 151 of FIG. 2 in the first embodiment and a voltage phase angle limiting unit 211 that outputs the second voltage phase reference $\delta^{**}$ from the first voltage phase reference $\delta^*$ and the voltage phase limit value $\delta_{vmax}^*$.

The voltage phase angle limiting unit 211 limits the first voltage phase reference $\delta^*$ by the voltage phase limit value $\delta_{vmax}^*$ to output the second voltage phase reference $\delta^{**}$.

The PWM control unit 22 computes three-phase voltage references $V_u^*, V_v^*, V_w^*$ based on the first voltage reference $V_1^*$, the second voltage phase reference $\delta^{**}$, and the position detected value $\theta_d$ according to Eq. 6 and outputs the PWM pulses $P_{uvw}^*$.

Although the present embodiment is provided with taking into account the power supply voltage $V_{dc}$. However, the embodiment can be provided with taking into account one or more of the power supply voltage $V_{dc}$, the computed frequency value $\omega_1$, and the d-axis current detected value $I_{dc}$ and the q-axis current detected value $I_{qc}$.

Also with the configuration of the present embodiment, if the torque reference $\tau^*$ specifies torque above the limit torque, the second voltage phase reference $\delta^{**}$ is set equal to the voltage phase limit value $\delta_{vmax}^*$ according to Eq. 4 and Eq. 5, and thus the limit torque is output. If the torque reference $\tau^*$ specifies torque at or below the limit torque, then the second voltage phase reference $\delta^{**}$ is smaller than the voltage phase limit value $\delta_{vmax}^*$, and hence torque as specified by the torque reference $\tau^*$ can be output.

Hence, the fourth embodiment can provides the same effect as the first to third embodiment.

Fifth Embodiment

Figure 17:
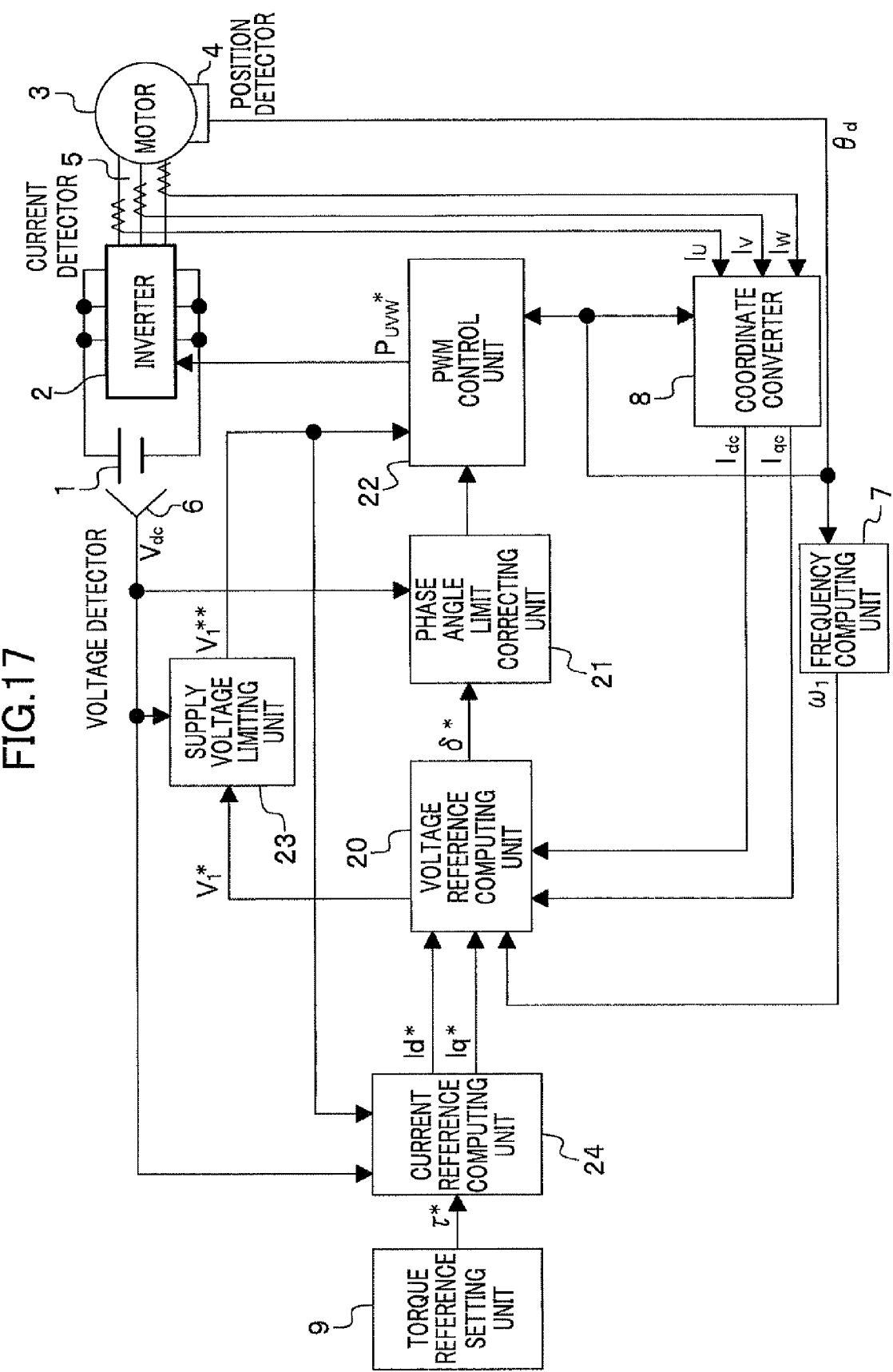
FIG. 17 is a block diagram of a motor control system according to a fifth embodiment.

FIG. 17 shows the entire configuration of a fifth embodiment. The motor control system includes the DC power supply 1, the inverter 2, the motor 3, the position detector 4, the current detector 5, the voltage detector 6, the frequency computing unit 7, the coordinate converter 8, and the torque reference setting unit 9, the voltage reference computing unit 20, the phase angle limit correcting unit 21, and the PWM control unit 22, which are the same as in the fourth embodiment, and of which description will be omitted.

The motor control system further includes a supply voltage limiting unit 23 which limits the first voltage reference $V_1^*$ based on the power supply voltage $V_{dc}$ that is supplied to the motor to output a second voltage reference $V_1^{}$ and the current reference computing unit 24**.

Although the current reference computing unit 19 of the fourth embodiment has the first voltage reference $V_1^*$ inputted thereto, the current reference computing unit 24 of the present embodiment is supplied with the second voltage reference $V_1^{**}$ limited based on the power supply voltage $V_{dc}$. By this means, overshoot in a transient state is suppressed, and hence the voltage reference limit $V_{1max}^*$ can be set to a large value even where the power supply voltage $V_{dc}$ abruptly changes.

Although the present embodiment is configured taking into account the power supply voltage $V_{dc}$, the embodiment can be provided with taking account one or more of the power supply voltage $V_{dc}$, the computed frequency value $\omega_1$, and the d-axis current detected value $I_{dc}$ and the q-axis current detected value $I_{qc}$.

Also with the configuration of the present embodiment, if the torque reference $\tau^*$ specifies torque above the limit torque, the second voltage phase reference $\delta^{**}$ is set equal to the voltage phase limit value $\delta_{vmax}^*$ according to Eq. 4 and Eq. 5, and thus the limit torque is output. If the torque reference $\tau^*$ specifies torque at or below the limit torque, then the second voltage phase reference $\delta^{**}$ is smaller than the voltage phase limit value $\delta_{vmax}^*$, and hence torque as specified by the torque reference $\tau^*$ can be output.

Hence, the same effect as with the first to third embodiments can be obtained.

Sixth Embodiment

Figure 18:
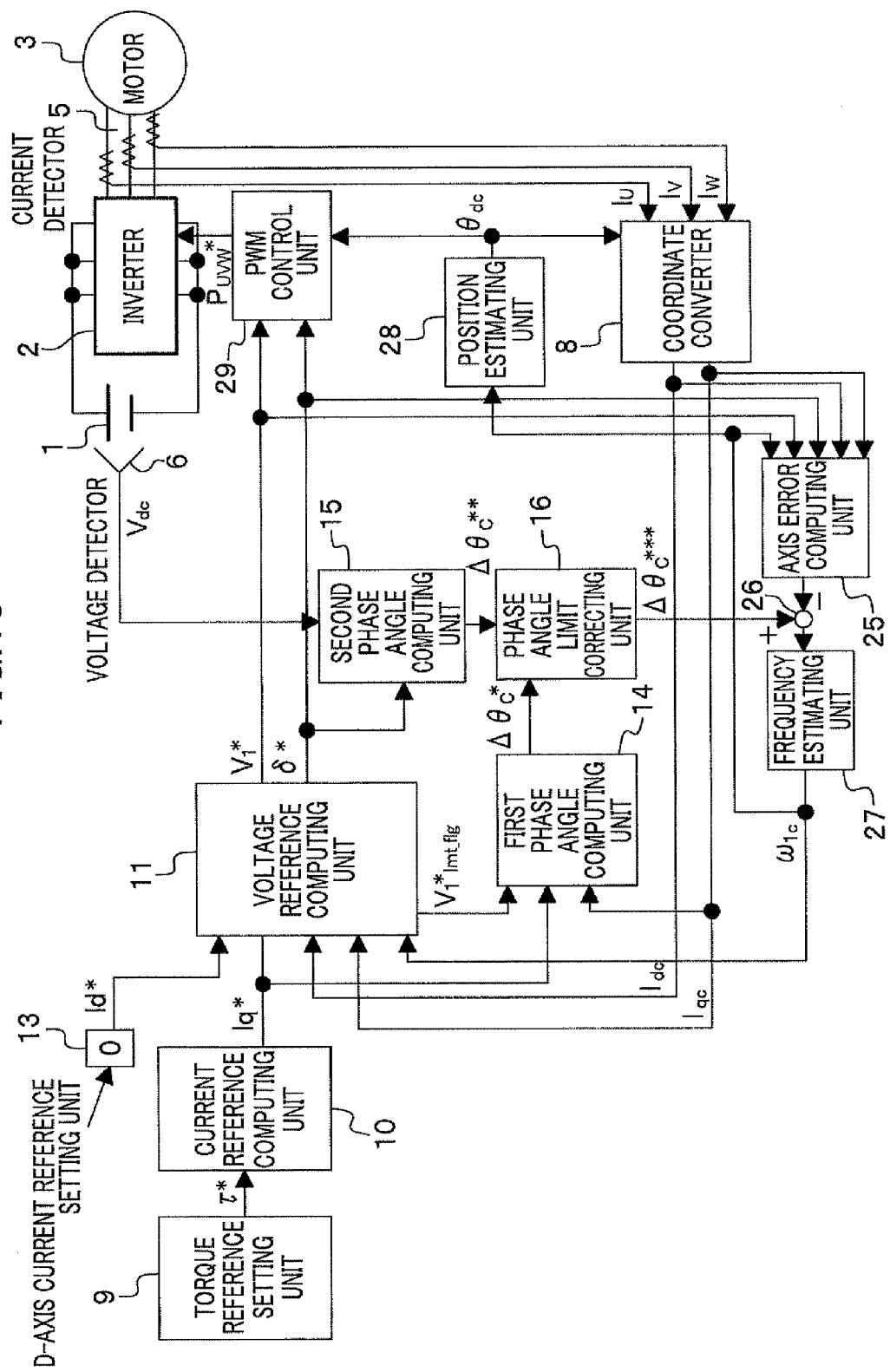
FIG. 18 is a block diagram of a motor control system according to a sixth embodiment.

FIG. 18 shows the entire configuration of a sixth embodiment. The motor control system of the sixth embodiment includes the DC power supply 1, the inverter 2, the motor 3, the current detector 5, the voltage detector 6, the coordinate converter 8, the torque reference setting unit 9, the current reference computing unit 10, the voltage reference computing unit 11, the d-axis current reference setting unit 13, the first phase angle computing unit 14, the second phase angle computing unit 15, and the phase angle limit correcting unit 16, which are the same as in the first embodiment, and of which description will be omitted.

The motor control system of the sixth embodiment further includes an axis error computing unit 25 to compute an axis error $\Delta\theta_c$ that is a deviation between the rotation phase value of the motor and the rotation phase reference of control from the first voltage reference $V_1^*$, the first voltage phase reference $\delta^*$, the d-axis current detected value $I_{dc}$, the q-axis current detected value $I_{qc}$, and a frequency estimate value $\omega_{1c}$ output from a frequency estimating unit 27; a subtracter 26 to subtract the axis error $\Delta\theta_c$ from the third phase angle reference $\Delta\theta_c^{*}$; the frequency estimating unit 27** to estimate the frequency estimate value $\omega_{1c}$ from the output of the subtracter 26; a position estimating unit 28 to estimate a position estimate value $\theta_{dc}$ from the frequency estimate value $\omega_{1c}$ by integration; and a PWM control unit 29 to output the PWM pulses based on the first voltage reference $V_1^*$, the first voltage phase reference $\delta^*$, and the position estimate value $\theta_{dc}$.

The axis error computing unit 25 computes the axis error $\Delta\theta_c$, which is a deviation between the rotation phase value of the motor and the rotation phase reference of control, from the first voltage reference $V_1^*$, the first voltage phase reference $\delta^*$, the d-axis current detected value $I_{dc}$, the q-axis current detected value $I_{qc}$, and the frequency estimate value $\omega_{1c}$ output from the frequency estimating unit 27 according to Eq. 17.

$$\Delta\theta_c = \tan^{-1}\left[\frac{-V_1^*\cdot\sin(\delta^*) - R^*\cdot I_{dc} - \omega_{1c}\cdot L_q^*\cdot I_{qc}}{V_1^*\cdot\cos(\delta^*) - R^*\cdot I_{qc} + \omega_{1c}\cdot L_q^*\cdot I_{dc}}\right] \quad \text{(Eq. 17)}$$

The PWM control unit 29 computes three-phase voltage references $V_u^*, V_v^*, V_w^*$ based on the first voltage reference $V_1^*$, the first voltage phase reference $\epsilon^*$, and the position estimate value $\theta_{dc}$ for the motor and outputs the PWM pulses $P_{uvw}^*$.

Although the present embodiment is provided with taking into account the power supply voltage $V_{dc}$, the embodiment can be provided with taking into account one or more of the power supply voltage $V_{dc}$, the frequency estimate value $\omega_{1c}$, and the d-axis current detected value $I_{dc}$ and the q-axis current detected value $I_{qc}$.

Also in the present embodiment, if the torque reference $\tau^*$ specifies torque above the limit torque, the second voltage phase reference $\delta^{**}$ is set equal to the voltage phase limit value $\delta_{vmax}^*$ according to Eq. 4 and Eq. 5, and thus the limit torque is output. If the torque reference $\tau^*$ specifies torque at or below the limit torque, then the second voltage phase reference $\delta^{**}$ is smaller than the voltage phase limit value $\delta_{vmax}^*$, and hence torque as specified by the torque reference $\tau^*$ can be output.

In the first to fifth embodiments, the axis error $\Delta\theta_c$ may be computed based on the first voltage reference $V_1^*$, the first voltage phase reference $\delta^*$, the d-axis current detected value $I_{dc}$, the q-axis current detected value $I_{qc}$, and the frequency estimate value $\omega_{1c}$, and the frequency estimate value $\omega_{1c}$ estimated such that the axis error $\Delta\theta_c$ becomes zero and the position estimate value $\theta_{dc}$ for the motor may be used instead of the position detected value $\theta_d$ detected by the position detector and the computed frequency value $\omega_1$, resulting in the same effect with the position detector being unwarranted.

Further, in the first to sixth, a DC shunt resistor usually provided in between the DC power supply 1 and the inverter 2 to detect the breaking of the power supply line may be used to detect the three-phase current values $I_u, I_v, I_w$ with the current detector 5 being omitted, resulting in the same effect.

In electric power steerings and in-vehicle devices using the present invention, the torque up to the limit torque can be output in field weakening control, and hence the body of the motor can be made smaller than in the prior art.

In the embodiments described above, the motor may be a non-salient-pole motor, or the motor has the proportion of reluctance torque to the total torque of the motor is at or below a predetermined value, and the second phase angle reference may be obtained by subtracting the resistance of the motor divided by the product of the inductance and frequency of the motor from $\pi/2$ [rad]. Further the second phase angle reference may be varied according to the temperature of the motor.

The invention claimed is:

1. A motor control apparatus, responsive to an input torque reference, for an inverter which drives a permanent magnet synchronous motor, comprising:
   a current detector which detects a d-axis current and a q-axis current supplied to the motor;
   a frequency detector which detects a frequency of the motor;
   a controller which generates an output voltage reference on the basis of the input torque reference, the detected d-axis and q-axis currents, and the detected frequency so as to control a deviation of a rotational phase angle of the motor from a rotational phase reference for controlling the motor below a limit value; and
   a limiter which varies the limit value on the basis of a quantity of a predetermined state of control, when the input torque reference is larger than the maximum torque value of the motor.

2. The motor control apparatus according to claim 1, wherein the quantity of the predetermined state of control is the voltage value of a power supply supplying power to the motor, the frequency value of the motor, or the current value of the motor.

3. An electric power steering having a motor control apparatus according to claim 1.

4. A motor control apparatus comprising:
   a d-axis current reference setting unit to set a d-axis current reference that is a magnetic pole direction of a rotor of a motor;
   a torque reference setting unit to set a torque reference for the motor;
   a current reference computing unit to compute a q-axis current reference electrically orthogonal to the d-axis based on the torque reference;
   a frequency computing unit to compute a frequency value from a position detected value;
   a coordinate converter to coordinate-convert detected values of phase currents flowing through the motor with the position detected value into a d-axis current detected value and a q-axis current detected value;
   a voltage reference computing unit to compute a first voltage reference, a first voltage phase reference, and a voltage limiting detection signal that are supplied to the motor based on the d-axis current reference, the q-axis current reference, the d-axis current detected value, the q-axis current detected value, and the computed frequency value;
   a first phase angle computing unit to compute a first phase angle reference from the q-axis current reference, the q-axis current detected value, and the voltage limiting detection signal;
   a second phase angle computing unit to compute a second phase angle reference from the first voltage phase reference and a quantity of a predetermined state;
   a phase angle limit correcting unit to limit the first phase angle reference according to the second phase angle reference to output a third phase angle reference; and
   a PWM control unit to output PWM pulses based on the first voltage reference, the first voltage phase reference, the position detected value, and the third phase angle reference.

5. The motor control apparatus according to claim 4, wherein the quantity of the predetermined state quantity is the voltage value of a power supply supplying power to the motor, the frequency value of the motor, or the current value of the motor.

6. The motor control apparatus according to claim 5, wherein the motor control apparatus is for controlling a motor mounted in a vehicle, and the power supply is a battery mounted in the vehicle.

7. The motor control apparatus according to claim 6, wherein the motor control apparatus comprises an electric control module comprising a microcomputer and electronic control components, and the voltage of the power supply is a voltage of a power supply line measured at terminals of the electric control module, the power supply line connecting the battery and the terminals of the electric control module.

8. The motor control apparatus according to claim 6, wherein the voltage of the battery is a voltage between terminals of the motor.

9. The motor control apparatus according to claim 4, wherein the motor is a salient-pole motor.

10. The motor control apparatus according to claim 5, wherein when the power supply voltage is at or below a predetermined value, the phase angle limit correcting unit either does not correct the third phase angle reference or corrects the third phase angle reference so as to be reduced.

11. The motor control apparatus according to claim 5, wherein the motor control apparatus is for controlling a motor that provides steering assistive power for a steering mechanism, and the frequency of the motor is the frequency of an output shaft of the motor providing steering assistive power.

12. The motor control apparatus according to claim 5, wherein the motor control apparatus is for controlling a motor that provides steering assistive power for a steering mechanism, and the frequency of the motor is steering speed of the steering mechanism multiplied by a coupling gear ratio between the steering mechanism and the motor.

13. The motor control apparatus according to claim 5, wherein the frequency of the motor is a frequency estimate value estimated from the first voltage reference, the first voltage phase reference, the d-axis current detected value, and the q-axis current detected value.

14. The motor control apparatus according to claim 5, wherein the frequency of the motor is a frequency reference supplied to the motor.

15. The motor control apparatus according to claim 5, wherein when the frequency of the motor is at or below a predetermined value, the phase angle limit correcting unit either holds the third phase angle reference at a constant value or corrects the third phase angle reference so as to be reduced.

16. The motor control apparatus according to claim 5, wherein the phase angle limit correcting unit corrects the third phase angle reference to be increased as the frequency of the motor becomes higher.

17. The motor control apparatus according to claim 5, wherein the motor is a non-salient-pole motor, or the motor has the proportion of reluctance torque to the total torque of the motor is at or below a predetermined value, and the second phase angle reference is obtained by subtracting the resistance of the motor divided by the product of the inductance and frequency of the motor from $\pi/2$ [rad].

18. The motor control apparatus according to claim 17, wherein the second phase angle reference is varied according to the temperature of the motor.

19. The motor control apparatus according to claim 5, wherein the current value of the motor is a value computed from the current reference given to the motor and the third phase angle reference.

20. The motor control apparatus according to claim 5, wherein the current value of the motor is a detected current value of the motor.

21. The motor control apparatus according to claim 5, wherein the second phase angle computing unit corrects the second phase angle reference to be increased as the power supply voltage becomes higher.

22. The motor control apparatus according to claim 21, wherein the second phase angle computing unit linearly corrects the second phase angle reference.

23. The motor control apparatus according to claim 21, wherein the second phase angle computing unit linearly corrects the second phase angle reference when a difference produced by subtracting a q-axis inductance from a d-axis inductance is at or below a predetermined value, the q-axis inductance and d-axis inductance being q-axis and d-axis components of the inductance of the motor, respectively.

24. The motor control apparatus according to claim 21, wherein the second phase angle computing unit corrects the second phase angle reference with a predetermined time delay from a change in the power supply voltage.

25. A motor control apparatus comprising:
a torque reference setting unit to set a torque reference for a motor;
a current reference computing unit to compute a current reference for a d-axis that is a magnetic pole direction of a rotor of the motor and a current reference for a q-axis electrically orthogonal to the d-axis based on the torque reference, a first voltage reference computed by a voltage reference computing unit, and a voltage detected value;
a frequency computing unit to compute a frequency value from a position detected value;
a coordinate converter to coordinate convert detected values of phase currents flowing through the motor with the position detected value into a d-axis current detected value and a q-axis current detected value;
the voltage reference computing unit to compute the first voltage reference and a first voltage phase reference that are supplied to the motor based on the d-axis current reference, the q-axis current reference, the d-axis current detected value, the q-axis current detected value, and the computed frequency value;
a phase angle limit correcting unit to limit the first voltage phase reference according to a quantity of a predetermined state to output a second voltage phase reference; and
a PWM control unit to output PWM pulses based on the first voltage reference, the second voltage phase reference, and the position detected value.

26. The motor control apparatus according to claim 25, wherein the quantity of the predetermined state is the voltage value of a power supply supplying power to the motor, the frequency value of the motor, or the current value of the motor.

27. A motor control apparatus comprising:
a torque reference computing unit to compute a torque reference for a motor;
a current reference computing unit to compute a current reference for a d-axis that is a magnetic pole direction of a rotor of the motor and a current reference for a q-axis electrically orthogonal to the d-axis based on the torque reference, a first voltage reference computed by a voltage reference computing unit, and a voltage detected value;
a frequency computing unit to compute a frequency value from a position detected value;
a coordinate converter to coordinate convert detected values of phase currents flowing through the motor with the position detected value into a d-axis current detected value and a q-axis current detected value;

the voltage reference computing unit to compute the first voltage reference and a first voltage phase reference that are supplied to the motor based on the d-axis current reference, the q-axis current reference, the d-axis current detected value, the q-axis current detected value, and the computed frequency value;

a supply voltage limiting unit to limit the first voltage reference supplied to the motor to a predetermined value or lower to output it as a second voltage reference;

a voltage phase angle limiting unit to limit the first voltage phase reference to a predetermined phase angle or lower;

a phase angle limit correcting unit to correct the predetermined phase angle according to a quantity of a predetermined state; and a PWM control unit to output PWM pulses based on the output of the supply voltage limiting unit, the output of the phase angle limit correcting unit, and the position detected value.

28. The motor control apparatus according to claim 27, wherein the quantity of the predetermined state is the voltage value of a power supply supplying power to the motor, the frequency value of the motor, or the current value of the motor.

29. A motor control apparatus comprising:

a d-axis current reference setting unit to set a current reference for a d-axis that is a magnetic pole direction of a rotor of a motor;

a torque reference setting unit to set a torque reference for the motor;

a current reference computing unit to compute a current reference for a q-axis electrically orthogonal to the d-axis based on the torque reference;

an axis error computing unit to compute an axis error that is a deviation between a rotation phase reference of control and a rotation phase value of the motor from the current references for the d-axis and the q-axis, a d-axis current detected value, a q-axis current detected value, a first voltage reference, a first voltage phase reference, and a frequency estimate value;

a subtracter to subtract the axis error from a third phase angle reference;

a frequency estimating unit to estimate the frequency estimate value based on the output of the subtracter;

a position estimating unit to estimate a position estimate value based on the frequency estimate value;

a coordinate converter to coordinate convert detected values of phase currents flowing through the motor with the position estimate value into a d-axis current detected value and a q-axis current detected value;

a voltage reference computing unit to compute the first voltage reference, the first voltage phase reference, and a voltage limiting detection signal that are supplied to the motor based on the d-axis current reference, the q-axis current reference, the d-axis current detected value, the q-axis current detected value, and a computed frequency value;

a first phase angle computing unit to compute a first phase angle reference from the q-axis current reference, the q-axis current detected value, and the voltage limiting detection signal;

a second phase angle computing unit to compute a second phase angle reference from the first voltage phase reference and a quantity of a predetermined state;

a phase angle limit correcting unit to limit the first phase angle reference according to the second phase angle reference to output the third phase angle reference; and a PWM control unit to output PWM pulses based on the first voltage reference, the first voltage phase reference, and the position estimate value.

30. The motor control apparatus according to claim 29, wherein the quantity of the predetermined state is the voltage value of a power supply supplying power to the motor, the frequency value of the motor, or the current value of the motor.

* * * * *